United States Patent [19]

Wamfler

[11] 4,078,769
[45] Mar. 14, 1978

[54] MOTION DAMPING MEANS FOR THE TAKE-UP SECTION OF A CABLE HAUL SYSTEM

[76] Inventor: Manfred Wamfler, Rheinstrasse 27, D-7858 Weil am Rhein-Markt, Germany

[21] Appl. No.: 687,361

[22] Filed: May 17, 1976

[30] Foreign Application Priority Data

Jul. 16, 1975  Germany .............................. 2531698

[51] Int. Cl.² .............................................. B66D 1/76
[52] U.S. Cl. .................................. 254/175.6; 191/12 R
[58] Field of Search ...................... 254/175.6, 175.5; 105/153, 150; 104/89, 1 R, 249; 191/12 R, 85, 95

[56] References Cited

U.S. PATENT DOCUMENTS

| 2,286,388 | 6/1942 | Smith | 254/175.5 |
| 2,571,832 | 10/1951 | Chapin, Jr. | 191/12 R |
| 3,882,288 | 5/1975 | Rasmussen | 191/12 R |

FOREIGN PATENT DOCUMENTS

| 2,206,309 | 2/1972 | Germany | 191/12 R |
| 2,129,333 | 6/1971 | Germany | 191/12 R |

*Primary Examiner*—Robert J. Spar
*Assistant Examiner*—Kenneth Noland
*Attorney, Agent, or Firm*—C. Emmett Pugh & Associates

[57] ABSTRACT

A motion damping means for the take-up section of a cable haul system in which one or more rail-mounted carriers support loops of cable, and where the carriers bunch together upon take-up of cable and move apart when cable is paid-out. The cable is fastened to a terminal clamp and at least the first carrier adjacent the clamp is acted upon by a force-exerting means for restraining motion of the carrier towards the clamp for storing at least part of the energy removed from the carrier in restraining this motion and for returning at least part of the energy to that carrier on payout of the cable. In specific embodiments of the invention, the force-exerting means is an elastic rope. Undue swinging of the loops of cable upon take-up is avoided by the restraining action on the carrier.

10 Claims, 2 Drawing Figures

MOTION DAMPING MEANS FOR THE TAKE-UP SECTION OF A CABLE HAUL SYSTEM

BACKGROUND OF THE INVENTION

1. Field of the Invention

The invention concerns a motion damping arrangement between a terminal clamp and the first line carrier of the take-up section for a cable haul system, where one or more cables are secured at a terminal clamp, and are guided over line carriers running on a rail. When the carriers bunch together the cable forms loops. The motion damping arrangement absorbs at least part of the kinetic energy of the first and subsequent line carriers.

2. Prior Art

In cable haul systems known hitherto the terminal clamp and/or the first line carrier include a motion damping arrangement. This arrangement usually takes the form of rubber buffers in which some of the kinetic energy of the line carriers is dissipated. When cable take-up is required, in general, when the first line carrier comes into contact with the terminal clamp, the sudden stop causes the loops of cable initially to swing violently in the direction of motion of the carriers sometimes striking the limiting wall, and subsequently to swing back to a rest position. In the course of this swinging, the loops may become entangled, and at the very least the cables rub violently against each other. Another disadvantage is that the buffers mounted on the terminal clamp or on the first line carrier are called upon to absorb practically all the kinetic energy of the cable system and are therefore subject to severe impact stresses.

These types of disadvantages and problems also arise in cable systems which are not fully extended where the first line carrier may remain practically stationary at the terminal clamp.

GENERAL DISCUSSION OF THE PRESENT INVENTION

The problem therefore arises of designing a motion damper and arranging it in such a way that the first line carrier is subject to braking over a substantial distance when the cable system relaxes, regardless of whether the haul system has previously been wholly or only partly extended.

In following the teaching of the invention, this is accomplished in a motion damping arrangement of the kind specified above, by linking the arrangement to the first line carrier, and to a fixed position, and by having the system pull the first line carrier away from the terminal clamp on pay-out of the cable using at least part of the energy absorbed in the cable take-up process.

Thus, when cable pay-out is required, the first line carrier is moved away from the terminal clamp by the motion damping arrangement, whilst during take-up of the cable, up to the point where the first carrier contacts the terminal clamp, it is decelerated effectively so that swinging of the cable loops can essentially be avoided.

More particularly in accordance with the invention, there is provided, in a cable take-up section for a cable haul system, wherein a cable is fastened to a terminal clamp and the cable is supported in the take-up section by one or more consecutive rail-mounted carriers, and wherein the carriers move in a direction towards the terminal clamp and into bunching arrangement with one another for take-up of the cable, and wherein the carriers move apart from one another and away from the terminal clamp upon pay-out of the cable, motion damping means for said take-up section which comprises a force exerting means, having a part located at a point fixed with respect to said terminal clamp, and having a second part connected at least to that carrier nearest the terminal clamp for exerting a force on said carrier in a direction, for restraining motion of said carrier towards the terminal clamp and for storing at least a part of the energy removed from said carrier in restraining said motion during take-up of the cable and for returning at least part of said energy of motion to said carrier on pay-out of the cable. The force-exerting means may be an elastic tensile element, for instance, a rope which may be partly or wholly of rubber or may consist of an essentially inextensible rope including an elastic element as a part of it. A guide pulley may support the elastic rope between the fixed point and the carrier, and the pulley may be placed at the point reached by the carrier when the cable is in fully paid-out position. The relaxed length of the rope may be less than the distance between the fixed point and the carrier at the paid-out position to ensure that the rope is in tension at all positions of the carrier. The force-exerting means may comprise an elastic rope arranged on one or both sides of the rail and transversely to it, each rope being supported on a guide pulley arranged approximately half-way between the terminal clamp and the position of the carrier when the cable is in paid-out position. The guide pulleys may be adjustable in a direction parallel to the rail and the fixed point may be adjustable with respect to the rail. Where the elastic rope runs parallel to the rail, the distance between the fixed point and the guide pulley may be equal to approximately half of the length of the cable between the carrier and the terminal clamp with the guide pulley being at a position essentially equal to this distance from the terminal clamp.

BRIEF DESCRIPTION OF THE DRAWINGS

Specific embodiments of the invention will now be described, with reference to the accompanying drawings, in which.

BRIEF DESCRIPTION OF PREFERRED EMBODIMENTS

Figure 1:
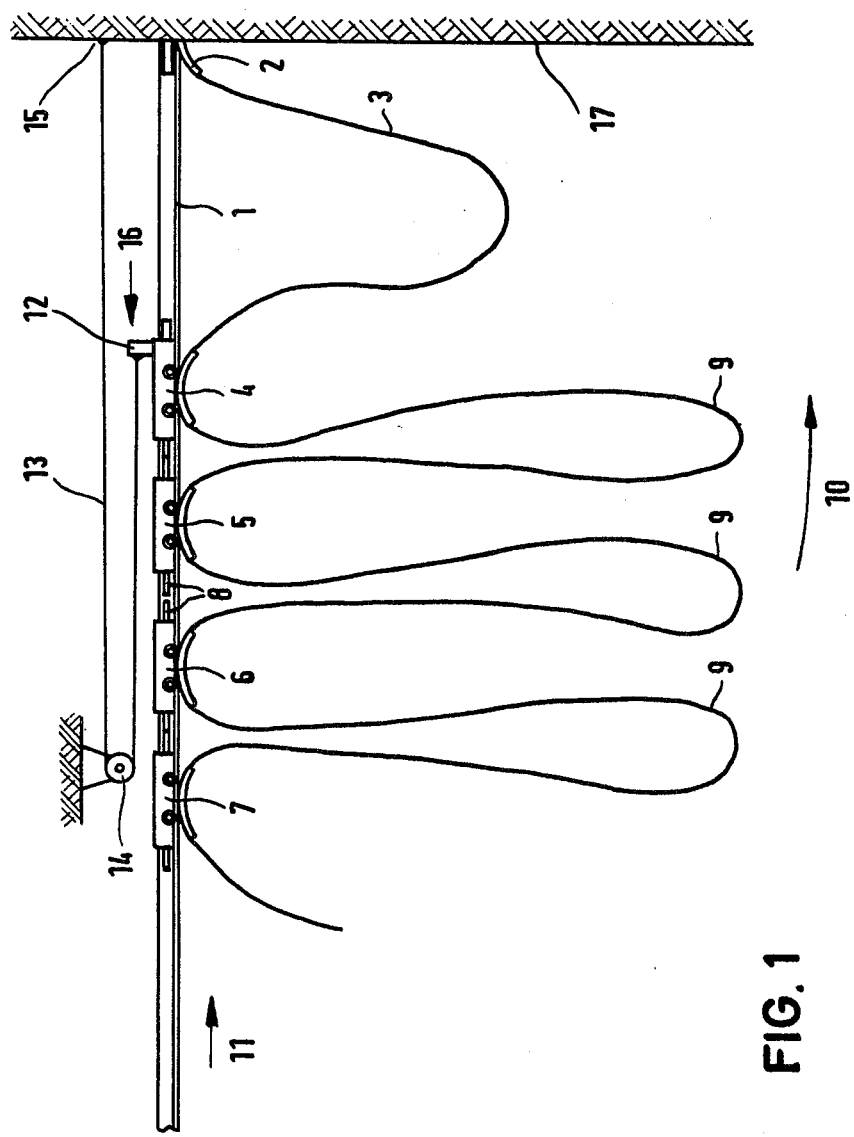
FIG. 1 shows a side view of one embodiment.

FIG. 1 shows part of the cable haul system in the relaxed, closed or take-up position. Starting at terminal clamp 2, a cable 3 is passed over and retained by a sequence of line carriers 4, 5, 6 and 7, which run on a rail 1. The front carrier and possibly also others, may be powered. When the carriers close up or bunch together, loops 9 of the cable are formed. The bunching takes place in the direction of arrow 11. Between the separate line carriers buffers 8 can be provided. In known cable haul systems the first line carrier 4 strikes very violently against terminal clamp 2, as a result of which cable loops 9 swing suddenly in the direction indicated by arrow 10. There is thus risk of damage to cable 3 by striking against wall 17, and significantly also of entanglement of cable loops 9 with one another.

In order to avoid this, an elastic rope 13 is secured to a retaining member 12 on the first line carrier 4. Rope 13 is preferably, but not necessarily, of rubber; and runs from retaining member 12 over a guide pulley 14 and is attached to wall 17 at a point 15. Rope 13 might also run along or closely adjacent rail 1 over its entire length and be secured fixedly at one end. When cable take-up occurs by movement of the carriers in direction 11, rope 13 becomes stretched, thus absorbing a considerable part of the energy of movement of carriers 4, 5, 6 and 7. As a result the line carriers are effectively decelerated as they bunch up. When cable is paid-out, the stretched rope 13 exerts a force in the direction of arrow 16 on the first line carrier, thereby ensuring that the first line carrier 4 is pulled away from terminal clamp 2, assisting in its movement independently of the cable forces.

The arrangement is preferably so designed that the tensile force in rope 13 suffices to apply tension to the cable loop between terminal clamp 2 and the first line carrier 4 when the loop is completely extended. Thus a maximum distance is available for the braking of the line carriers during the take-up process.

Since the energy to be absorbed by the motion damping arrangement during bunching is usually greater than the energy required to move the first line carrier 4 away from the terminal clamp 2 during extension of the cable haul system, the motion damping arrangement should dissipate some of the input energy. This can be accomplished by means of an auxilliary energy absorbing arrangement (not shown), or by providing rope 13 with a certain self-damping capacity.

Figure 2:
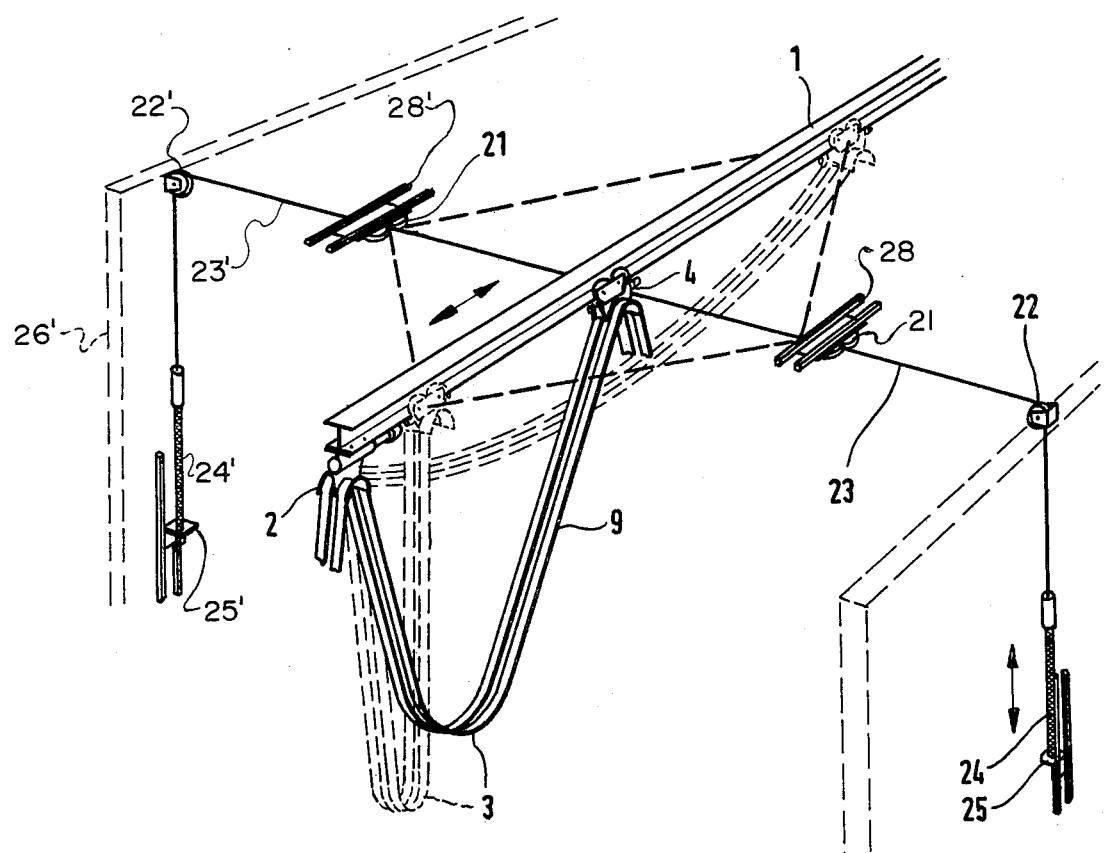
FIG. 2 shows a perspective view of a second embodiment.

In the embodiment according to FIG. 2 the last cable loop 9 passes from terminal clamp 2 to the first line carrier 4. The positions of loop 9 and line carrier 4 in the drawing are approximately midway between the fully closed up position and the fully extended position in which the line loop is more or less under tension. Steel cables 23 and 23' are attached on either side of line carrier 4. Each steel cable is guided at an appropriate distance from rail 1 by a respective double guide pulleys 21 and 21'. From guide pulleys 21 and 21' cables 23 and 23' pass over support rolls 22 and 22', respectively at walls 26 and 26'. Rubber springs 24 and 24' are provided adjacent walls 26 and 26', with respective cables 23 and 23' being attached to each. The points of attachment of each rubber spring to its respective wall are denoted by 25 and 25'. The cables 23 and 23' with their springs 24 and 24' thus form elastic ropes.

Guide pulleys 21 and 21' with their respective fixtures are securable and slidable on rails 28 and 28' parallel to rail 1. The points of attachmeent 25 and 25' of rubber springs 24, 24' are vertically adjustable.

In this embodiment the two rubber springs 24 and 24' (which may also be lengths of rubber rope), are placed under tension when the line carriers close up from the position shown in the drawing. The potential energy store in springs 24,24' during this closing-up process is then available during extension, i.e., rubber springs 24,24' return the first line carrier 4 automatically to approximately the position shown in FIG. 2. If the line carriers are fully extended to a position where loop 9 between terminal clamp 2 and first line carrier 4 is almost completely opened out, the two rubber springs 24, 24' are once more placed under tensile stress. This affords the additional advantage of preventing the upward lashing and overstressing of the last line loop during the opening-up motion of the line carriers. Thus, the motion damping system according to FIG. 2 acts in both directions, during both the bunching-up and the pay-out of the take-up system.

The adjustability of points of attachment 25 and 25' and guide pulleys 21 and 21' permits optimum adjustment of the functioning of the motion damping system.

This two-directional operation of the damping device during both the closing and opening of the take-up system can also be accomplished with the design according to FIG. 1. In this case guide pulley 14 would be placed at a distance from point of attachment 15 which is equal to half the length of the last cable loop between terminal clamp 2 and the first line carrier 4. The rope 13 would then have a relaxed length essentially equal to the above-specified distance. Guide pulley 14 is then preferably designed as a double pulley to prevent rope 13 from disengaging.

What is claimed as invention is:

1. In a cable take-up section for a cable haul system, wherein a cable is fastened to a terminal clamp and the cable is supported in the take-up section by one or more consecutive rail-mounted carriers, and wherein the carriers move in a direction towards the terminal clamp and into bunching arrangement with one another for take-up of the cable, and wherein the carriers move apart from one another and away from the terminal clamp upon pay-out of the cable, motion damping means for said take-up section which comprises,
   force exerting means having a part located at a point fixed with respect to said terminal clamp, and having a second part connected at least to that carrier nearest the terminal clamp for exerting a force on said carrier in a direction, for restraining motion of said carrier towards the terminal clamp and for storing at least a part of the energy removed from said carrier in restraining said motion during take-up of the cable and for returning at least part of said energy of motion to said carrier on pay-out of the cable, said force exerting means being looped about guide pulley means only when said carrier nearest the terminal clamp approaches said terminal clamp and when said carrier is between said terminal clamp and said guide pulley means, and said force exerting means being arranged parallel to the travel of said carriers and thereby operating in tension to restrain the motion of said carrier nearest said terminal clamp when said carrier is between said terminal clamp and said guide pulley means.

2. Apparatus as defined in claim 1, said force-exerting means comprising, at least partly, a tensile elastic element.

3. Apparatus as defined in claim 2, the tensile elastic element comprising an elastic rope.

4. Apparatus as defined in claim 2, the elastic rope comprising a rubber rope.

5. In a cable take-up section for cable haul system, wherein a cable is fastened to a terminal clamp and the cable is supported in the take-up section by one or more consecutive rail-mounted carriers, and wherein the carriers move in a direction towards the terminal clamp and into bunching arrangement with one another for take-up of the cable, and wherein the carriers move apart from one another and away from the terminal clamp upon pay-out of the cable, motion damping means for said take-up section which comprises,
   force exerting means having a part located at a point fixed with respect to said terminal clamp and having a second part connected at least to that carrier nearest the terminal clamp for exerting a force on said carrier in a direction, for restraining motion for said carrier towards the terminal clamp and for storing at least a part of the energy removed from said carrier in restraining said motion during take-up of the cable and for returning at least part of said energy of said motion to said carrier on pay-out of the cable, said force exerting means comprising, at least partly an elastic rope, a rail-mounting the carrier, and the elastic rope comprising at least partly a rubber rope arranged parallel to the rail, passing from the fixed point to said carrier and a guide pulley supporting said elastic rope between the fixed point and the carrier.

6. Apparatus as defined in claim 5, the cable being fastened to the carrier, and the distance between the fixed point and the guide pulley being greater or equal to the length of cable between the carrier and the terminal clamp, and the relaxed length of the elastic rope being less than said cable length.

7. Apparatus as defined in claim 5, the elastic rope including means for dissipating at least part of the energy expended when stretching the elastic rope.

8. Apparatus as defined in claim 5, said guide pulley being adjustable in a direction parallel to said rail.

9. Apparatus as defined in claim 5, the fixed point being adjustable with respect to said rail.

10. Apparatus as defined in claim 5, the cable being fastened to the carrier, and the distance between the fixed point and the guide pulley being approximately equal to half the length of cable between the carrier and the terminal clamp, the relaxed length of the elastic rope being approximately equal to this said cable length, and the guide pulley being at a position essentially the aforementioned distance from said terminal clamp.

* * * * *